(12) United States Patent
Emanuele et al.

(10) Patent No.: US 11,236,276 B2
(45) Date of Patent: Feb. 1, 2022

(54) SELF-SULFIDING OF GUARD REACTOR CATALYST FOR SOLVENT ASSISTED TAR CONVERSION PROCESSES

(71) Applicant: ExxonMobil Chemical Patents Inc., Baytown, TX (US)

(72) Inventors: Krystle J. Emanuele, Houston, TX (US); Glenn A. Heeter, The Woodlands, TX (US); Kapil Kandel, Humble, TX (US); Teng Xu, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 143 days.

(21) Appl. No.: 16/544,551

(22) Filed: Aug. 19, 2019

(65) Prior Publication Data

US 2020/0063047 A1    Feb. 27, 2020

Related U.S. Application Data

(60) Provisional application No. 62/720,966, filed on Aug. 22, 2018.

(51) Int. Cl.

| | |
|---|---|
| *C10G 69/06* | (2006.01) |
| *B01J 23/755* | (2006.01) |
| *B01J 23/28* | (2006.01) |
| *B01J 37/20* | (2006.01) |
| *C10G 67/14* | (2006.01) |
| *C10G 67/02* | (2006.01) |

(52) U.S. Cl.
CPC .............. *C10G 69/06* (2013.01); *B01J 23/28* (2013.01); *B01J 23/755* (2013.01); *B01J 37/20* (2013.01); *C10G 67/02* (2013.01); *C10G 67/14* (2013.01); *C10G 2300/1003* (2013.01); *C10G 2300/202* (2013.01); *C10G 2300/208* (2013.01); *C10G 2300/302* (2013.01); *C10G 2300/308* (2013.01)

(58) Field of Classification Search
CPC ..................................................... C10G 69/06
See application file for complete search history.

(56) References Cited

U.S. PATENT DOCUMENTS

| | | | |
|---|---|---|---|
| 2011/0000819 A1* | 1/2011 | Keusenkothen | C10G 11/00 208/89 |
| 2014/0061096 A1* | 3/2014 | Brown | C10G 69/06 208/73 |
| 2018/0171239 A1 | 6/2018 | Chen et al. | |

FOREIGN PATENT DOCUMENTS

| | | |
|---|---|---|
| EP | 2751233 B | 9/2016 |
| WO | 2018/111574 A | 6/2018 |

* cited by examiner

*Primary Examiner* — Randy Boyer (57) ABSTRACT

The present disclosure provides methods for hydroprocessing of heavy oils, such as pyrolysis tars. For example, a process for preparing a liquid hydrocarbon product includes providing a first process stream comprising a reduced reactivity tar, and blending the first process stream with a utility fluid to produce a second process stream comprising solids and a reduced reactivity, lower viscosity tar. The method can includes introducing the second process stream into a guard reactor without sulfiding the guard reactor catalyst(s) prior to introducing the second process stream into the guard reactor. The method includes hydroprocessing the second process stream in the guard reactor under mild hydroprocessing conditions to produce a third process stream. The method includes hydroprocessing the third process stream to produce a fourth process stream having a bromine number (BN) lower than 12 and comprising the liquid hydrocarbon product and the utility fluid.

25 Claims, 5 Drawing Sheets

SELF-SULFIDING OF GUARD REACTOR CATALYST FOR SOLVENT ASSISTED TAR CONVERSION PROCESSES

PRIORITY

This application claims priority to and the benefit of U.S. Provisional Application No. 62/720,966, filed Aug. 22, 2018, and is incorporated herein by reference.

FIELD OF THE INVENTION

The present disclosure provides methods for hydroprocessing of pyrolysis tars. In particular, the present disclosure provides methods for sulfiding guard reactor catalyst(s).

BACKGROUND

Pyrolysis processes, such as steam cracking, are utilized for converting saturated hydrocarbons to higher-value products such as light olefins, e.g., ethylene and propylene. Besides these useful products, hydrocarbon pyrolysis can also produce a significant amount of relatively low-value heavy products, such as pyrolysis tar. When the pyrolysis is steam cracking, the pyrolysis tar is identified as steam-cracker tar ("SCT").

Pyrolysis tar is a high-boiling, viscous, reactive material comprising complex, ringed and branched molecules that can polymerize and foul equipment. Pyrolysis tar also contains high molecular weight non-volatile components including paraffin insoluble compounds, such as pentane-insoluble compounds and heptane-insoluble compounds. Particularly challenging pyrolysis tars contain >0.5 wt. %, sometimes >1.0 wt. % or even >2.0 wt. % of toluene insoluble compounds. The high molecular weight compounds are typically multi-ring structures that are also referred to as tar heavies ("TH"). These high molecular weight molecules can be generated during the pyrolysis process, and their high molecular weight leads to high viscosity, which limits desirable pyrolysis tar disposition options. For example, it may be desirable to find higher-value uses for SCT, such as for fluxing with heavy hydrocarbons, especially heavy hydrocarbons of relatively high viscosity. It can also be desirable to be able to blend SCT with one or more heavy oils, examples of which include bunker fuel, burner oil, heavy fuel oil (e.g., No. 5 or No. 6 fuel oil), high-sulfur fuel oil, low-sulfur oil, regular-sulfur fuel oil ("RSFO"), Emission Controlled Area fuel (ECA) with <0.1 wt. % sulfur and the like.

Hydroprocessing heavy hydrocarbons such as SCT involves heating the material during the various hydroprocessing stages to temperatures greater than 250° C. For example, during a hydrotreatment stage, the temperature can be 350° C. or higher in order to facilitate the addition of hydrogen to reduce levels of sulfur, nitrogen and saturated hydrocarbons. However, tar is reactive because of the levels of unsaturated hydrocarbons (and radicals formed therefrom), some of which are more reactive than others, present in the heavy feed. Without proper management, hydroprocessing of heavy hydrocarbons can lead to rapid reactor fouling at temperatures as low as 250° C. Hence, depending upon tar reactivity, pretreating processes are performed prior to hydroprocessing.

For example, in a Solvent Assisted Tar Conversion (SATC) process, after pyrolysis, the pyrolysis tar can be blended with a utility fluid and centrifuged. The effluent from the centrifuge proceeds to various hydroprocessing reactors for various stages of hydroprocessing. The first of such hydroprocessing reactors is referred to as a guard reactor. Each hydroprocessing stage includes the use of one or more hydroprocessing catalysts. The hydroprocessing catalysts can include transition metals and the catalysts are sulfided by a sulfiding process to activate the catalyst(s) into an active form and to promote hydroprocessing of the pyrolysis tar upon contact with the sulfided catalyst(s). A sulfiding process typically includes flowing a catalyst activator, such as a sulfur-containing compound (such as dimethyldisulfide (DMDS)), from an activator source into each of the hydroprocessing reactors for the various hydroprocessing stages. Sulfiding processes involve use of equipment (such as a start pump and a feed pump) which add to an already complex multistage hydroprocessing setup. Sulfiding processes are also time and energy intensive (e.g., hold times of 60 hours at a set point of 340° C.). After a sulfiding process, the pumps are cleaned with solvent.

In addition, for a hydroprocessing stage, hydrogen flow is stopped in order to perform a sulfiding process within a hydroprocessing reactor. After a sulfiding process, the hydrogen flow is then restarted. This discontinuous hydroprocessing/sulfiding is time intensive and inefficient.

There is a need for efficient processes for hydroprocessing pyrolysis tar to reduce demand in energy consumption, use of materials and equipment, and amount of time to obtain hydroprocessing products (such as hydroconverted SCT), while maintaining or improving reactor fouling during the various hydroprocessing stages.

SUMMARY

The present disclosure provides methods for hydroprocessing of heavy oils, such as pyrolysis tars. In at least one embodiment, a process for preparing a liquid hydrocarbon product includes providing a first process stream comprising a reduced reactivity tar, and blending the first process stream with a utility fluid to produce a second process stream comprising solids and a reduced reactivity, lower viscosity tar. The method can include introducing the second process stream into a guard reactor without sulfiding the guard reactor catalyst(s) prior to introducing the second process stream into the guard reactor. The method includes hydroprocessing the second process stream in the guard reactor under mild hydroprocessing conditions to produce a third process stream. The method includes hydroprocessing the third process stream to produce a fourth process stream having a bromine number (BN) of about 12 or less. The method includes hydroprocessing the fourth process stream to produce a fifth process stream comprising the liquid hydrocarbon product and the utility fluid. The method includes separating the utility fluid from the liquid hydrocarbon product. It has been discovered that pyrolysis tar obtained from pyrolysis and/or a centrifuge (with or without added utility fluid) includes sulfur-containing compounds sufficient to activate hydroprocessing catalyst(s) located in a guard reactor, which can provide reduced demand in energy consumption of a SATC process, reduced use of materials and equipment for a SATC process, and reduced amount of time to obtain hydroprocessing products (such as low-sulfur fuel oil (LSFO)), while maintaining or improving fouling during the various hydroprocessing stages.

BRIEF DESCRIPTION OF THE DRAWINGS

The drawings are for illustrative purposes only and are not intended to limit the scope of the present invention.

DETAILED DESCRIPTION

The present disclosure provides methods for hydroprocessing of heavy oils, such as pyrolysis tars. In particular, the present disclosure provides methods for sulfiding guard reactor catalyst(s). In at least one embodiment, a process for preparing a liquid hydrocarbon product includes thermally treating (e.g., heat soaking) a tar stream to produce a first process stream comprising a reduced reactivity tar, and blending the first process stream with a utility fluid to produce a second process stream comprising solids and a reduced reactivity, lower viscosity tar. A method can include introducing the second process stream into a guard reactor without prior sulfiding the guard reactor catalyst(s) before introducing the pyrolysis tar into the guard reactor. A method can include hydroprocessing the second process stream in the guard reactor under mild hydroprocessing conditions to produce a third process stream. A method can include hydroprocessing the third process stream, e.g. at a temperature of 340° C. or greater, to produce a fourth process stream. A method can include hydroprocessing the fourth process stream to produce a fifth process stream comprising the liquid hydrocarbon product and the utility fluid. A method can include separating the utility fluid from the liquid hydrocarbon product. Bromine number can be used to indicate whether the pyrolysis tar will have a tendency to foul a hydroprocessing reactor operating under the desired hydroprocessing conditions. In at least one embodiment, the fourth process stream and/or the liquid hydrocarbon product has a bromine number lower than 10, such as a bromine number lower than 8. It has been discovered that pyrolysis tar obtained from pyrolysis and/or a centrifuge (with or without added utility fluid) includes sulfur-containing compounds sufficient to activate hydroprocessing catalyst(s) located in a guard reactor, which can provide reduced demand in energy consumption of a solvent assisted tar conversion (SATC) process, reduced use of materials and equipment, and reduced amount of time to obtain hydroprocessing products (such as low-sulfur fuel oil (LSFO)), while maintaining or improving fouling during the various hydroprocessing stages.

As used herein, a "catalyst activator source" or "activator source" means a source of catalyst activator that is not a heavy oil, such as a tar. A catalyst activator can be a sulfur-containing compound, such as dimethyldisulfide. An activator source is coupled with a hydroprocessing reactor, such as a conventional guard reactor.

As used herein, "heavy oil" can include a pyrolysis tar, an atmospheric residue, a vacuum residue, a coal tar, a biomass tar, or mixtures thereof.

In at least one embodiment, a heavy oil, such as a pyrolysis tar, at a temperature $T_1$ of 350° C. or less is evaluated for its potential for fouling the reactor at desired hydroprocessing conditions. The evaluation is undertaken by sampling the pyrolysis tar and measuring BN of the tar. If a tar has a BN of 28 or less, then the tar can be provided to hydroprocessing without one or more additional pretreatment processes (such as thermal treatment or heat soaking). Alternatively, a tar having a BN of greater than 28 may be blended with a second pyrolysis tar and/or utility fluid to reduce the vinyl aromatics content (indicative of free radical content) of the blended tar for hydroprocessing. Thermal treatments (e.g., heat soaking) suitable for providing a pyrolysis tar that is sufficiently non-reactive for hydroprocessing (BN of 28 or less) are disclosed in P.C.T. Patent Application Publication No. WO2018/111574, which is incorporated by reference herein in its entirety.

A plurality of pyrolysis tars, including a plurality of SCTs, may be blended prior to hydroprocessing to produce a blended pyrolysis tar with a desired free radical profile, e.g., one exhibiting a blended sample $BN_{Blend} \leq$ a desired BN value (e.g., 28). Further, the SCTs or pyrolysis tars (or blends thereof) may be combined with a utility fluid for hydroprocessing.

The term "pyrolysis tar" means (a) a mixture of hydrocarbons having one or more aromatic components and optionally (b) non-aromatic and/or non-hydrocarbon molecules, the mixture being derived from hydrocarbon pyrolysis, with at least 70% of the mixture having a boiling point at atmospheric pressure that is about 550° F. (290° C.) or greater. Certain pyrolysis tars have an initial boiling point of 200° C. or greater. For certain pyrolysis tars, 90 wt. % or greater of the pyrolysis tar has a boiling point at atmospheric pressure of 550° F. (290° C.) or greater. Pyrolysis tar can comprise, e.g., 50 wt. % or greater, e.g., 75 wt. % or greater, such as 90 wt. % or greater, based on the weight of the pyrolysis tar, of hydrocarbon molecules (including mixtures and aggregates thereof) having (i) one or more aromatic components, and (ii) a number of carbon atoms of about 15 or greater. Pyrolysis tar generally has a metals content of $1.0 \times 10^3$ ppmw or less, based on the weight of the pyrolysis tar, which is an amount of metals that is far less than that found in crude oil (or crude oil components) of the same average viscosity.

As used herein, "steam cracking tar" ("SCT") means pyrolysis tar obtained from steam cracking.

"Tar Heavies" (TH) are a product of hydrocarbon pyrolysis having an atmospheric boiling point of 565° C. or greater and comprising 5 wt. % or greater of molecules having a plurality of aromatic cores based on the weight of the product. The TH are typically solid at 25° C. and generally include the fraction of SCT that is not soluble in a 5:1 (vol.:vol.) ratio of n-pentane: SCT at 25° C. TH generally includes asphaltenes and other high molecular weight molecules.

The present disclosure is not limited to these aspects, and this description is not meant to foreclose other aspects within the broader scope of the invention.

Production of Pyrolysis Tar

Pyrolysis tars are a by-product of a pyrolysis process. Pyrolysis tar can be produced by exposing a hydrocarbon-containing feed to pyrolysis conditions in order to produce a pyrolysis effluent, the pyrolysis effluent being a mixture comprising unreacted feed, unsaturated hydrocarbon produced from the feed during the pyrolysis, and pyrolysis tar. For example, when a feed comprising 10 wt. % hydrocarbon or greater, based on the weight of the feed, is subjected to pyrolysis, the pyrolysis effluent generally contains pyrolysis tar and 1 wt. % or greater of $C_2$ unsaturates, based on the weight of the pyrolysis effluent. The pyrolysis tar typically comprises 90 wt. % or greater of the pyrolysis effluent's molecules having an atmospheric boiling point of 290° C. or greater. Generally, the pyrolysis of a hydrocarbon feed of greater molecular weight will produce a greater amount of pyrolysis tar. Besides hydrocarbon, the feed to pyrolysis may further comprise diluent, e.g., one or more of nitrogen, water, etc. For example, the feed may further comprise 1 wt. % or greater diluent based on the weight of the feed, such as 25 wt. % or greater. When the diluent includes an appreciable amount of steam, the pyrolysis is referred to as steam cracking. The hydrocarbon product of a steam cracker furnace generally includes (i) lower molecular weight compounds such as one or more of acetylene, ethylene, propylene, butenes, and (ii) higher molecular weight compounds such as one or more $C_5+$ compounds, and mixtures thereof, including SCT. SCT is typically separated from the aqueous and/or hydrocarbon product of a steam cracker in one or more separation stages. Other streams that may be separated from the steam cracking furnace effluent include one or more of (a) steam-cracked naphtha ("SCN", e.g., $C_5$ to $C_{10}$ species) and steam cracked gas oil ("SCGO"), the SCGO comprising ≥90 wt. % based on the weight of the SCGO of molecules (e.g., Cm to $C_{17}$ species) having an atmospheric boiling point of about 400° F. to 550° F. (200° C. to 290° C.). SCT is typically included in a separator bottoms stream, which typically comprises 90 wt. % or greater SCT, based on the weight of the bottoms stream. The SCT can have, e.g., a boiling range of about 550° F. (290° C.) or greater and can comprise molecules and mixtures thereof having a number of carbon atoms of about 15 or greater.

Steam cracking furnaces typically include two main sections: a convection section and a radiant section, the radiant section typically containing fired heaters. Flue gas from the fired heaters is conveyed out of the radiant section to the convection section. The flue gas flows through the convection section and is then conducted away, e.g., to one or more treatments for removing combustion by-products such as $NO_x$. Hydrocarbon is introduced into tubular coils (convection coils) located in the convection section. Steam is also introduced into the coils, where it combines with the hydrocarbon to produce a pyrolysis feed. The combination of indirect heating by the flue gas and direct heating by the steam leads to vaporization of at least a portion of the pyrolysis feed's hydrocarbon component. The pyrolysis feed containing the vaporized hydrocarbon component is then transferred from the convection coils to tubular radiant tubes located in the radiant section. Indirect heating of the pyrolysis feed in the radiant tubes results in cracking of at least a portion of the pyrolysis feed's hydrocarbon component. Pyrolysis effluent is conducted out of the radiant tube, and away from the pyrolysis furnace, the pyrolysis effluent comprising products resulting from the pyrolysis of the pyrolysis feedstock and any unconverted components of the pyrolysis feed. At least one separation stage is generally located downstream of the pyrolysis furnace, the separation stage being utilized for separating from the pyrolysis effluent one or more of light olefin, SCN, SCGO, SCT, water, unreacted hydrocarbon components of the pyrolysis feedstock, etc.

The pyrolysis feedstock for steam cracking typically comprises hydrocarbon and steam. In certain aspects, the pyrolysis feedstock comprises 10 wt. % or greater hydrocarbon, based on the weight of the pyrolysis feedstock, e.g., 25 wt. % or greater, 50 wt. % or greater, such as 65 wt. % or greater. Although the pyrolysis feedstock's hydrocarbon can comprise one or more light hydrocarbons such as methane, ethane, propane, butane etc., it can be particularly advantageous to utilize a pyrolysis feedstock comprising a significant amount of higher molecular weight hydrocarbons because the pyrolysis of these molecules generally results in more pyrolysis tar than does the pyrolysis of lower molecular weight hydrocarbons. As an example, the pyrolysis feedstock can comprise 1 wt. % or greater or 25 wt. % or greater based on the weight of the pyrolysis feedstock of hydrocarbons that are in the liquid phase at ambient temperature and atmospheric pressure.

The hydrocarbon component of the pyrolysis feedstock comprises 10 wt. % or greater, e.g., 50 wt. % or greater, such as 90 wt. % or greater (based on the weight of the hydrocarbon) of one or more of naphtha, gas oil, vacuum gas oil, waxy residues, atmospheric residues, residue admixtures, or crude oil; including those comprising about 0.1 wt. % or greater asphaltenes. When the hydrocarbon includes crude oil and/or one or more fractions thereof, the crude oil is optionally desalted prior to being included in the pyrolysis feedstock. An example of a crude oil fraction utilized in the pyrolysis feedstock is produced by separating atmospheric pipestill ("APS") bottoms from a crude oil followed by vacuum pipestill ("VPS") treatment of the APS bottoms.

Suitable crude oils include, e.g., high-sulfur virgin crude oils, such as those rich in polycyclic aromatics. For example, the pyrolysis feedstock's hydrocarbon can include ≥90 wt. % of one or more crude oils and/or one or more crude oil fractions, such as those obtained from an atmospheric APS and/or VPS; waxy residues; atmospheric residues; naphthas contaminated with crude; various residue admixtures; and SCT. In these aspects, the steam cracking conditions generally include one or more of (i) a temperature from 760° C. to 880° C., (ii) a pressure from 1 to 5 bars (absolute), or (iii) a cracking residence time from 0.10 to 2 seconds.

Pyrolysis Effluent

A pyrolysis effluent is conducted away from the pyrolysis furnace, e.g. away from a steam cracker furnace. Pyrolysis tar such as SCT is contained in the furnace's effluent.

When utilizing the pyrolysis feedstock and pyrolysis conditions of one or more of the preceding aspects, the pyrolysis effluent generally comprises 1 wt. % or greater of $C_2$ unsaturates and 0.1 wt. % or greater of TH, the weight percents being based on the weight of the pyrolysis effluent. Optionally, the pyrolysis effluent comprises 5 wt. % or greater of $C_2$ unsaturates and/or 0.5 wt. % or greater of TH, such as 1 wt. % or greater TH. Although the pyrolysis effluent generally contains a mixture of light olefins, SCN, SCGO, pyrolysis tar (such as SCT), and unreacted components of the pyrolysis feedstock (e.g., water in the case of steam cracking, but also in some cases unreacted hydrocarbon), the relative amount of each of these generally depends on, e.g., the pyrolysis feedstock's composition, pyrolysis furnace configuration, process conditions during the pyrolysis, etc. The pyrolysis effluent is generally conducted away from the pyrolysis section, e.g., for cooling and separation.

In certain aspects, the pyrolysis effluent's TH comprise 10 wt. % or greater of TH aggregates having an average size of 10 nm to 300 nm in at least one dimension and an average number of carbon atoms of 50 or greater, the weight percent being based on the weight of Tar Heavies in the pyrolysis effluent. Generally, the aggregates comprise 50 wt. % or greater, e.g., 80 wt. % or greater, such as 90 wt. % or greater of TH molecules having a C:H atomic ratio from 1 to 1.8, a molecular weight of 250 to 5000, and a melting point of 100° C. to 700° C.

The pyrolysis effluent can be cooled downstream of the pyrolysis furnace. In at least one embodiment, a cooling stage is located between the pyrolysis furnace and the separation stage. Conventional cooling means can be utilized by the cooling stage, e.g., one or more of direct quench and/or indirect heat exchange (e.g., transfer line heat exchange). For example, the transfer-line heat exchangers can cool the pyrolysis effluent to a temperature of about 700° C. to 350° C., in order to efficiently generate super-high pressure steam which can be utilized by the process or conducted away. If desired, the pyrolysis effluent can be subjected to direct quench, e.g., at a location between the furnace outlet and the separation stage.

Pyrolysis Tars

At least one separation stage is typically utilized downstream of the pyrolysis furnace and downstream of the transfer line exchanger and/or quench location. Generally, the separation stage removes one or more of light olefin, SCN, SCGO, pyrolysis tars (e.g. SCT), and water from the pyrolysis effluent. Conventional separation equipment can be utilized in the separation stage, e.g., one or more flash drums, fractionators, water-quench towers, indirect condensers, etc., such as those described in U.S. Pat. No. 8,083,931. The separation stage can be utilized for separating a pyrolysis tar stream (or in the event of steam cracking, an SCT stream) from the pyrolysis effluent. The pyrolysis tar stream typically contains 90 wt. % or greater of pyrolysis tar or SCT, based on the weight of the tar stream, e.g., 95 wt. % or greater, such as 99 wt. % or greater, with 90 wt. % or greater of the balance of the tar stream being particulates, for example. The tar stream comprises 10% or greater (on a weight basis) of the pyrolysis effluent's TH, based on the weight of the pyrolysis effluent's tar heavies. The pyrolysis tar stream can be obtained, e.g., from an SCGO stream and/or a bottoms stream of the steam cracker's primary fractionator, from flash-drum bottoms (e.g., the bottoms of one or more flash drums located downstream of the pyrolysis furnace and upstream of the primary fractionator), or a combination thereof. For example, the pyrolysis tar stream can be a mixture of primary fractionator bottoms and tar knock-out drum bottoms.

The pyrolysis tar can be an SCT, for example. SCT generally comprises 50 wt. % or greater, such as, 90 wt. % or greater, of the pyrolysis effluent's TH based on the weight of the pyrolysis effluent's TH. For example, the SCT can have (i) a TH content from 5 wt. % to 40 wt. %, based on the weight of the SCT, (ii) an API gravity (measured at a temperature of 15.8° C.) of −7.5° API or less, such as −8° API or less, or −8.5° API or less; and (iii) a 50° C. viscosity of 200 cSt to $1.0 \times 10^7$ cSt. The SCT can have, e.g., a sulfur content that is greater than 0.5 wt. %, e.g., of 0.5 wt. % to 7 wt. %, based on the weight of the SCT. In aspects where pyrolysis feedstock does not contain an appreciable amount of sulfur, the SCT can comprise 0.5 wt. % or less sulfur, e.g., 0.1 wt. % or less, such as 0.05 wt. % or less sulfur, based on the weight of the SCT. The amount of olefin in the SCT is generally 10 wt. % or less, e.g., 5 wt. % or less, such as 2 wt. % or less, based on the weight of the SCT. More particularly, the amount of (i) vinyl aromatics in the SCT is generally 5 wt. % or less, e.g., 3 wt. % or less, such as 2 wt. % or less and/or (ii) aggregates in the SCT which incorporate vinyl aromatics is generally 5 wt. % or less, e.g., 3 wt. % or less, such as 2 wt. % or less, the weight percents being based on the weight of the SCT. In one aspect, greater than 70 wt. % of the pyrolysis tar's molecules have an atmospheric boiling point of greater than 290° C.

A steam cracker tar typically comprises 50 wt. % or greater of the steam cracker effluent's TH, based on the weight of the steam cracker effluent's TH, e.g., 75 wt. % or greater, such as 90 wt. % or greater. The SCT can have, e.g., (i) a sulfur content of from 0.5 wt. % to 7 wt. %, based on the weight of the SCT; (ii) a TH content of from 5 wt. % to 40 wt. %, based on the weight of the SCT; (iii) a density at 15° C. of from 1.01 g/cm³ to 1.19 g/cm³, e.g., 1.07 g/cm³ to 1.18 g/cm³; and (iv) a 50° C. viscosity of from 200 cSt to $1.0 \times 10^7$ cSt. The amount of olefin in the SCT is generally 10 wt. % or less, e.g., 5 wt. % or less, such as 2 wt. % or less, based on the weight of the pyrolysis tar or SCT. More particularly, the amount of (i) vinyl aromatics in the SCT and/or (ii) within aggregates in the SCT which incorporate vinyl aromatics is generally 5 wt. % or less, e.g., 3 wt. % or less, such as 2 wt. % or less, based on the weight of the SCT.

Optionally, the SCT has a density measured at 15° C. of from 1.01 g/cm³ to 1.19 g/cm³. Methods of the present disclosure are particularly advantageous for SCT's having density at 15° C. that is 1.10 g/cm³ or greater, e.g., 1.12 g/cm³ or greater, 1.14 g/cm³ or greater, 1.16 g/cm³ or greater, or 1.17 g/cm³ or greater. Optionally, the SCT has a viscosity measured at 50° C. of 200 cSt to $1.0 \times 10^7$ cSt, e.g., $1.0 \times 10^4$ cSt or greater, such as $1.0 \times 10^5$ cSt or greater, or $1.0 \times 10^6$ cSt or greater, or $1.0 \times 10^7$ cSt or greater.

Optionally, the SCT has a normal boiling point of 290° C. or greater, a viscosity at 15° C. of $1 \times 10^4$ cSt or greater, and a density of 1.1 g/cm³ or greater. The SCT can be a mixture which includes a first SCT and one or more additional pyrolysis tars, e.g., a combination of the first SCT and one or more additional SCTs. When the SCT is a mixture, it is typical for at least 70 wt. % of the mixture to have a normal boiling point of at least 290° C., and include free radicals. When the mixture comprises first and second pyrolysis tars (one or more of which is optionally an SCT) 90 wt. % or greater of the second pyrolysis tar optionally has a normal boiling point of 290° C. or greater.

The fouling tendency of a pyrolysis tar during hydroprocessing varies from one batch to another depending upon, for example, the pyrolysis tar's thermal history during pyrolysis and thereafter. While not wishing to be bound by any particular theory, it is believed that the tendency of a pyrolysis tar to foul can be determined based on the concentrations of free radicals in a suitably-prepared sample of the pyrolysis tar.

A tar of the present disclosure can have a BN of 40 or less, such as 35 or less, such as 30 or less, such as 28 or less, such as 26 or less, such as 24 or less, such as 22 or less. When a pyrolysis tar exhibits a BN of greater than 28, blending the pyrolysis tar with a second tar having a lesser BN value can be used to produce a pyrolysis tar blend having a BN of 28 or less.

For example, a blend's BN value can be determined from the BN of the first and second pyrolysis tar components, ($BN_{T1}$ and $BN_{T2}$) using the formula:

$$BN_{Tblend} = [(BN_{T1} \ast \text{grams tar 1}) + (BN_{T2} \ast \text{grams tar 2})] / (\text{grams tar 1} + \text{grams tar 2}).$$

$BNT_{blend}$ can be readily determined using the methods specified for measuring BN of an individual pyrolysis tar.

For instance, a hydroprocessing is to take place at or above 400° C., and a residence time of 10 minutes or greater using a tar having a $BN_{T1}$. If $BN_{T1}$ is 28 or less, no alteration or blending of the SCT is indicated before hydroprocessing. If however $BN_{T1}$ is greater than 28, fouling potential of the tar is lessened by blending SCT1 with a second SCT (SCT 2), where $BN_{T2}$ (i.e., BN of SCT 2) is less than 28 for SCT2. For instance, if $BN_{T1}$ is about 30 and $BN_{T2}$ is about 20, then a blend of 100 grams of SCT1 with about 100 grams of SCT2 (e.g., using a blend ratio of (wt. % SCT2 in blend/wt. % SCT 1 in blend) about 1:1) is estimated to produce a blended SCT with an estimated $BN_{Tblend}$ (i.e., BN of the blend) of about 25. If a blended sample measured $BN_{Tblend}$ is still greater than 28, the blend ratio may be increased, for instance using (wt. % SCT2 in blend/wt. % SCT 1 in blend)=60:40, and retest the new blend using a BN process of the present disclosure. For a further decreasing in fouling potential, blending can be continued beyond the blend ratio where $BN_{Tblend}$ does not exceed a desired BN value, e.g., to achieve a $BN_{Tblend}$ the desired BN value, such as $BN_{Tblend}$ of 20 or less.

In other aspects, instead of (or in addition to) blending, when $BN_{Tblend}$ exceeds a desired BN value, the measured $BN_{Tblend}$ can be used as an indicator of the potential fouling characteristics of the particular pyrolysis tar, and the blend can be sent away.

Tar Process Overview

Figure 1:
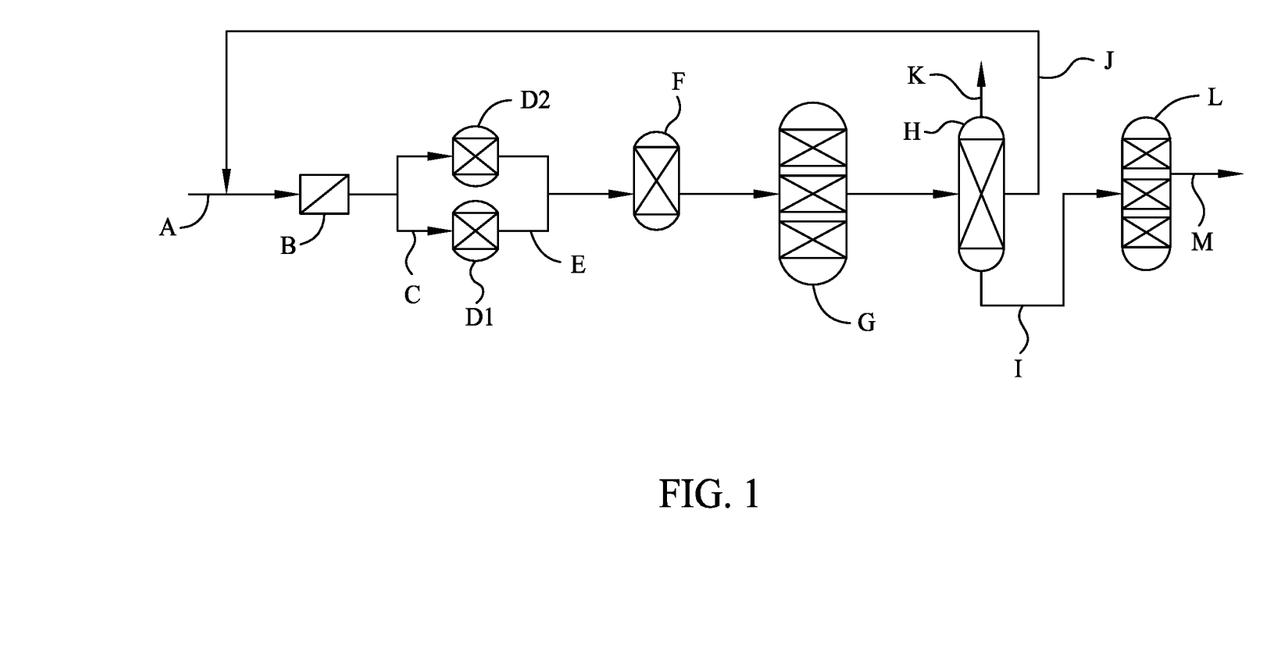
FIG. 1 is a process flow diagram illustrating an overview of certain aspects of a process of the present disclosure, according to at least one embodiment.

Bromine number of a pyrolysis tar and/or a guard reactor effluent of the present disclosure can be used to determine desired treatment (e.g., pretreatment) processes. For example, the values can be used to determine steam cracking process conditions, such as temperature and residence time. FIG. 1 is a process flow diagram illustrating an overview of certain aspects of a process of the present disclosure. A tar stream to be processed A is thermally treated (e.g., heat soaked) to reduce reactivity during transport to a centrifuge B. A utility fluid J (which may act as a solvent for at least a portion of the tar's hydrocarbon compounds) may be added to the tar stream to reduce viscosity. Utility fluid may be recovered from the process for recycle (e.g., as shown in FIG. 1). A filter (not shown) may be included in the transport line to remove relatively large insoluble material, e.g., relatively large solids. The thermally processed tar stream is centrifuged to remove insoluble material (e.g., solids) larger than 25 μm. The "cleared" liquid product tar stream is fed to a guard reactor, in the present illustration via a pretreatment manifold C, which directs the tar stream between an online guard reactor D1 and a guard reactor D2 that can be held offline, for instance for maintenance. Alternatively, because the tar feed of the present disclosure is used to sulfide the hydroprocessing catalyst(s) in a first guard reactor, the presence of a second guard reactor is merely optional. The guard reactor is typically operated under mild hydroprocessing conditions to further reduce the tar reactivity. The effluent from the guard reactor passes through an outlet manifold E to a pretreatment hydroprocessing reactor (a "pretreater") F for further hydroprocessing under somewhat harsher conditions and with a more active catalyst. The effluent from the pretreatment hydroprocessing reactor has a BN value of 12 or less and passes to a main hydroprocessing reactor G for further hydroprocessing under yet more severe conditions to obtain a liquid hydrocarbon product that is of blending quality, but conventionally remains somewhat high in sulfur. However, because a sulfiding process is not performed in the guard reactor, sulfur content is reduced in the liquid hydrocarbon product, as compared to liquid hydrocarbon products prepared using a hydroprocessing catalyst(s) that has been sulfided in the guard reactor prior to introducing pyrolysis tar into the guard reactor.

Recovery facility H includes at least one separation, e.g., fractionation, for separating from the liquid hydrocarbon product (i) a light stream I suitable for fuels use, (ii) a bottom fraction K which includes heavier components of the TLP, and (iii) a mid-cut. At least a portion of the mid-cut can be recycled to the tar feed as utility fluid via line J. The bottoms fraction K can be fed to a $2^{nd}$ Stage hydroprocessing reactor L for an additional hydroprocessing that provides desulfurization. The effluent stream M from the $2^{nd}$ Stage hydroprocessing reactor is of low sulfur content and is suitable for blending into an ECA ("Emission Control Area") or LSFO ("Low Sulfur Fuel Oil") compliant fuel.

Figure 2:
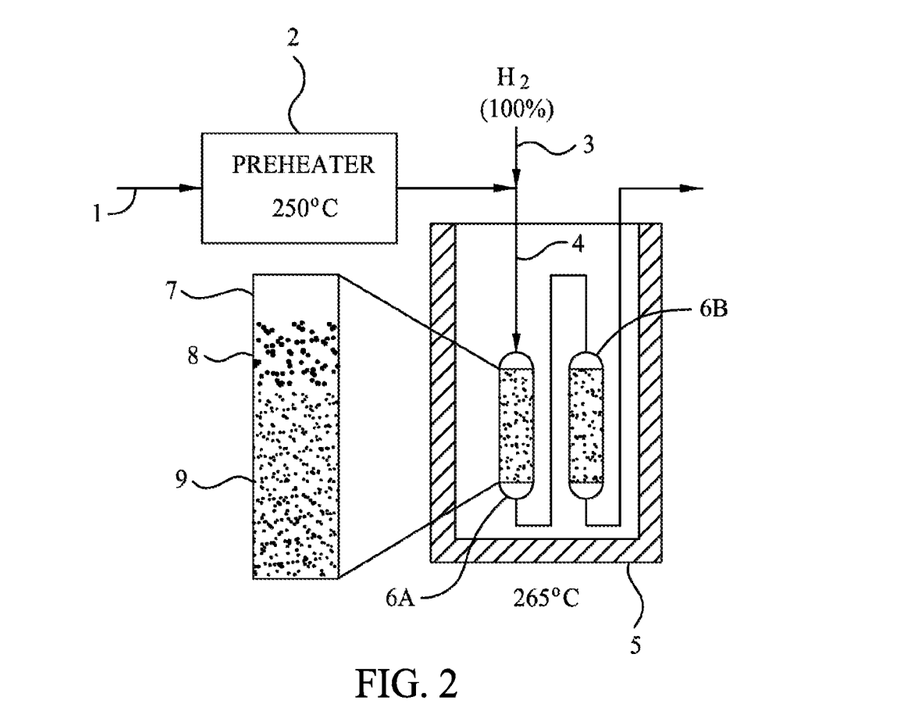
FIG. 2 illustrates a guard reactor configuration, according to at least one embodiment.

Pretreatment in a Guard Reactor to Decrease Tar Reactivity and Decrease Fouling by Particulates in Centrifuge Effluent and Decrease Pretreater Fouling A guard reactor (e.g., D1 or D2 of FIG. 1) is used to protect downstream reactors from fouling from reactive olefins and solids. Two guard reactors can be run in alternating mode—one on-line with the other off-line. When one of the guard reactors exhibits an undesirable increase in pressure drop, it is brought off-line so that it can be serviced and restored to condition for continued guard reactor operation. Restoration while off-line can be carried out, e.g., by replacing reactor packing and replacing or regenerating the reactor's internals, including catalyst. A plurality of (online) guard reactors can be used. The guard reactors can be arranged serially (e.g., as shown in FIG. 2) or two guard reactors to be arranged in parallel. For example, two sets of the series guard reactors of FIG. 2 can be arranged in parallel.

A pyrolysis tar composition (such as a thermally treated tar composition) having solids >25 μm substantially removed is conducted via a line for processing in at least one guard reactor. This composition is combined with utility fluid (and/or recycled utility fluid) supplied via a line to produce the tar-fluid mixture in line. Optionally, a supplemental utility fluid, may be added via a conduit. A first pre-heater preheats the tar-fluid mixture (which typically is primarily in liquid phase), and the pre-heated mixture is conducted to a supplemental pre-heating stage via a conduit. A supplemental pre-heater stage can be used, e.g., can be a fired heater. Recycled treat gas is obtained from a conduit and, if necessary, is mixed with fresh treat gas, supplied through a conduit. The treat gas is conducted via a conduit through a second pre-heater before being conducted to the supplemental pre-heat stage via a conduit. Fouling in a main hydroprocessing reactor can be decreased by increasing feed pre-heater duty in the pre-heaters.

The pre-heated tar-fluid mixture is combined with pre-heated treat gas and then conducted via a line to a guard reactor inlet manifold. A mixer can be utilized for combining the pre-heated tar-fluid mixture with the pre-heated treat gas in the guard reactor inlet manifold. The guard reactor inlet manifold directs the combined tar-fluid mixture and treat gas to online guard reactor(s) via an appropriate configuration of guard reactor inlet valves. An offline guard reactor, which can be isolated from the pretreatment inlet manifold by a closed valve and a second isolation valve downstream of the outlet of the reactor. The on-line reactor can also be brought off-line, and isolated from the process, when the off-line reactor is brought on-line. The reactors can be brought off-line in sequence (one after the other) so that one of the reactors is on-line while the other is off-line, e.g., for regeneration. Effluent from the online guard reactor(s) is conducted to further downstream processes via a guard reactor outlet manifold and line.

The guard reactor can be run with operating parameters that minimize fouling so that run-length targets can be met for the guard reactor, typically about 2 months or greater, such as 2 months to 6 months. Tar BN can be from 28 BN to 40 BN on a tar basis or 19 BN and 25 BN on a feed basis, respectively, since the BN of a typical utility fluid, e.g., the BN of the mid-cut stream can be around 3 BN.

FIG. 2 illustrates a guard reactor configuration, according to at least one embodiment. In FIG. 2, a tar feed 1 is preheated in a heater to the operating temperature, for example 250° C. The preheated tar feed is combined with a treat gas feed, such as molecular hydrogen, and the combined feed 4 is sent to the guard reactors 6A and 6B, shown in this example as arranged in series. Temperature controller 5 (e.g., a first sandbath) maintains the guard reactors at the operating temperature. The packing in the guard reactor is enlarged. 7 is a layer of a relatively low-reactivity hydroprocessing catalyst, 8 is a layer of catalyst. 9 is a layer of a relatively high-activity catalyst. One or more of the catalysts are not sulfided prior to introduction of the tar feed into the guard reactors (6A and 6B). The tar feed is introduced to into guard reactors (6A and 6B) without sulfiding one or more of the catalysts and/or catalyst layers.

The configuration illustrated in FIG. 2 can test the solids (e.g., coke and polymeric) balance at the entrance and exit of the guard reactor. The sandbath simulates temperature regulation of a commercial guard reactor, and temperature is maintained at 265° C.

Figure 3:
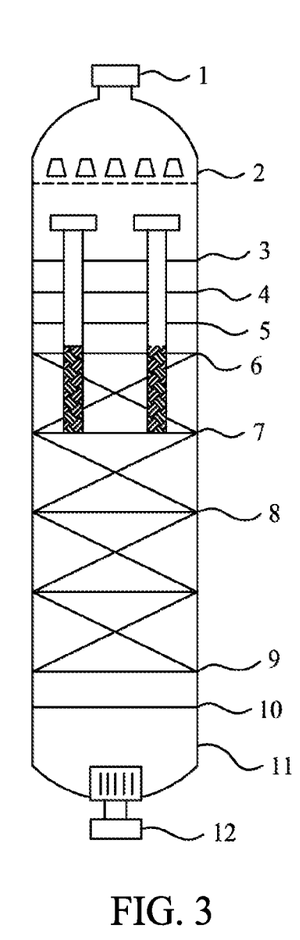
FIG. 3 illustrates a guard reactor configuration, according to at least one embodiment.

FIG. 3 illustrates a guard reactor configuration, according to at least one embodiment. The guard reactor can be used, e.g., to protect the pretreatment hydroprocessing reactor and other downstream apparatus from reactive and solids fouling. The reactor also typically exhibits a run length that is of sufficient duration to allow for efficient switching in sequence of the guard reactor and a parallel second guard reactor from regeneration mode (off line) to hydroprocessing mode (on line) without an appreciable disruption of tar processing at locations downstream of the guard reactors. Because the tar feed of the present disclosure is used as a sulfur source, a second guard reactor and catalyst regeneration processes are merely optional, providing additional reduction of disruption of tar processing at locations downstream of the guard reactors. If needed, guard reactor run length can be increased, e.g., by incorporating a scale basket for diverting treat gas flow to a lower section of the reactor by bypassing reactor zones that have developed an undesirable increase in pressure drop (dP).

In certain aspects, the guard reactor is configured with size grading to allow the single bed reactor to retain particles in the feed at a reactor depth which depends on size of the retained particulate. In certain aspects, larger particles, e.g., having a size ≥100 μm are retained in the upper part of the reactor, and smaller particles, e.g., having a size of from 40 μm to 60 μm, are retained in a lower section of the reactor bed where smaller extrudates are packed. Alternatively or in addition, activity grading, e.g., by locating a less-active catalyst at the entrance of the guard reactor, can be used to moderate the reactor's exotherm. Without such moderation, thermal effects may accelerate reactive fouling and increase hydrogen consumption.

In the representative guard reactor of FIG. 3, 1 is an inlet configured to receive a tar-treat gas mixture. The treat gas does not include a sulfur-containing compound. 2 is a "hat" providing clearance and flow distribution. 3 is a layer of a relatively high void-space ceramic topping material to provide relief of pressure drop caused by fouling. 4 and 5 are each layers of filter material that selectively traps particulates. 6, 7, 8, 9, 10, and 11 are each layers containing a catalytically effective amount of one or more materials having activity for catalytic hydroprocessing. The tar feed is introduced into the guard reactors (e.g., via inlet 1) without sulfiding the one or more materials having activity for catalytic hydroprocessing before introducing the tar feed into the guard reactors. The size and composition of each of these catalytic layers is independently selected, and each may be the same or different from any of the others. 12 is an outlet collector and outlet.

A guard reactor of the present disclosure can be operated under guard reactor hydroprocessing conditions. Typically, these conditions include a temperature of from 200° C. to 300° C., more typically 200° C. to 280° C., or 250° C. to 280° C., or 250° C. to 270° C., or 260° C. to 300° C.; a total pressure of from 1000 psia to 1600 psia; typically 1300 psia to 1500 psia, a space velocity ("WHSV") of from 2 $hr^{-1}$ to 10 $hr^{-1}$, 5 $hr^{-1}$ to 7 $hr^{-1}$. The guard reactor contains a catalytically-effective amount of at least one hydroprocessing catalyst. Typically, upstream beds of the reactor include at least one catalyst having de-metallization activity, e.g., relatively large-pore catalysts to capture metals in the feed. Beds located further downstream in the reactor typically contain at least one catalyst having activity for olefin saturation, e.g., catalyst containing Ni and/or Mo. The guard reactor typically can receive as feed a tar-fluid mixture having a BN<28. Guard reactor run length is typically about 2 months or greater.

Liquid hourly space velocity (LHSV) of the combined tar+utility fluid volume per volume of catalyst for hydroprocessing in a guard reactor can be 0.1 $h^{-1}$ or more, e.g., from 0.1 $h^{-1}$ to 30 $h^{-1}$, or 1 $h^{-1}$ to 10 $h^{-1}$, or 3 $h^{-1}$ to 4 $h^{-1}$, such as about 3.6. A molecular hydrogen consumption rate in a guard reactor for a hydroprocess of the present disclosure can be of from 200 standard cubic meters of hydrogen/cubic meter of pyrolysis tar (S $m^3/m^3$) to about 900 S $m^3/m^3$, such as 200 S $m^3/m^3$ to 500 S $m^3/m^3$ or 600 S $m^3/m^3$ to 850 S $m^3/m^3$. Hydrogen consumption can be measured according to ASTM-7171 via hydrogen content difference between liquid feed and product.

For commercial scale processes, an amount of hydroprocessing catalyst in one or more of the guard reactors during hydroprocessing can be from about 20,000 lbs to about 150,000 lbs, such as about 40,000 lbs to about 90,000 lbs, such as from about 65,000 lbs to about 75,000 lbs, for example about 70,000 lbs. Without being bound by theory, the hydroprocessing catalyst present in a guard reactor is sufficient to capture reactive olefins that are not reacted in heat soaking as well as some large solids particles not separated in the centrifuge. In contrast, an amount of hydroprocessing catalyst in a pretreater (such as pretreatment hydroprocessing reactor F of FIG. 1) can be from about 150,000 lbs to about 400,000 lbs, such as from about 200,000 lbs to about 300,000 lbs, for example about 250,000 lbs. Without being bound by theory, the hydroprocessing catalyst present in a pretreater is sufficient to reduce BN of the tar+utility fluid.

Utility Fluid and Recycle

In certain aspects, a utility fluid can include aromatics, e.g., 70.0 wt. % or more aromatics, based on the weight of the utility fluid, such as 80.0 wt. % or more, or 90.0 wt. % or more. Typically, the utility fluid comprises 10.0 wt. % or less of paraffin, based on the weight of the utility fluid. For example, the utility fluid can comprise 95.0 wt. % or more of aromatics, 5.0 wt. % or less of paraffin. Optionally, the utility fluid has a final boiling point of 750° C. (1400° F.) or less, e.g., 570° C. (1050° F.) or less, such as 430° C. (806° F.) or less. Such utility fluids can comprise 25.0 wt. % or more of 1-ring and 2-ring aromatics (i.e., those aromatics having one or two rings and at least one aromatic core), based on the weight of the utility fluid. Utility fluids having a relatively low final boiling point can be used, e.g., a utility fluid having a final boiling point of 400° C. (750° F.) or less. The utility fluid can have an 10% (weight basis) total boiling point of 120° C. or more, e.g., 140° C. or more, such as 150° C. or more and/or a 90% total boiling point of 430° C. or less, e.g., 400° C. or less. Suitable utility fluids include those having a true boiling point distribution generally from 175° C. (350° F.) to about 400° C. (750° F.). A true boiling point distribution can be determined, e.g., by conventional methods such as the method of ASTM D7500. It is generally desirable for the utility fluid to be substantially free of molecules having alkenyl functionality, particularly in aspects utilizing a hydroprocessing catalyst having a tendency for coke formation in the presence of such molecules.

Certain solvents and solvent mixtures can be used as utility fluid, including SCN, SCGO, and/or other solvent comprising aromatics, such as those solvents comprising 90.0 wt. % or more, e.g., 95.0 wt. % or more, such as 99.0 wt. % or more of aromatics, based on the weight of the solvent. Representative aromatic solvents that are suitable for use as utility fluid include A200 solvent, available from ExxonMobil Chemical Company (Houston Tex.), CAS number 64742-94-5.

After tar hydroprocessing is operating in the steady-state, under specified tar hydroprocessing conditions, at least a portion of the utility fluid can be obtained from the hydroprocessed product, e.g., by separating and recycling a portion of the hydroprocessed product. Methods for obtaining a suitable utility fluid from the hydroprocessed product are disclosed, e.g., in U.S. Patent Application Publication No. 2014-0061096 and in Provisional U.S. Patent Application No. 61/986,316. When utilizing a utility fluid that is obtained at least in part from the hydroprocessed product, a portion thereof can be stored for later use. The stored utility fluid can be used, e.g., a primer fluid when re-starting tar hydroprocessing after a shut-down and/or when starting a second tar hydroprocessor. Should the amount of utility fluid derived from the process be insufficient for producing an tar-utility fluid mixture of the specified relative amounts of tar and utility fluid, additional utility fluid can be obtained from a supplemental source ("supplemental utility fluid"). The supplemental utility fluid can comprise one or more of the specified solvents or solvent mixtures, and stored utility fluid.

The relative amounts of utility fluid and tar during hydroprocessing are generally from about 20.0 wt. % to about 95.0 wt. % of the tar and from about 5.0 wt. % to about 80.0 wt. % of the utility fluid, based on total weight of utility fluid plus tar. For example, the relative amounts of utility fluid and tar can be from (i) about 20.0 wt. % to about 90.0 wt. % of the tar, e.g., about 40.0 wt. % to about 90.0 wt. %, and about 10.0 wt. % to about 80.0 wt. % of the utility fluid, e.g., about 10.0 wt. % to about 60.0 wt. % of the utility. In certain aspects, the combined SCT+utility fluid has a utility fluid: tar weight ratio of 0.01 or more, e.g., from 0.05 to 4.0, such as 0.1 to 3.0, or 0.3 to 1.1. At least a portion of the utility fluid can be combined with at least a portion of the tar within the hydroprocessing vessel or hydroprocessing zone, but this is not required, and in certain aspects at least a portion of the utility fluid and at least a portion of the tar are supplied as separate streams and combined into one stream prior to entering, e.g., upstream of the hydroprocessing stage(s). The relative amount of primer fluid and tar during start-up can be substantially the same as the relative amounts of utility fluid and tar during tar hydroprocessing.

Catalysts for Hydroprocessing in a Guard Reactor(s) and for Hydroprocessing in Additional Reactors Downstream of the Guard Reactor(s)

In one or more embodiments, the hydroprocessing catalyst includes at least one metal from any of Groups 5 to 10 of the Periodic Table of the Elements (tabulated as the Periodic Chart of the Elements, The Merck Index, Merck & Co., Inc., 1996). Examples of such catalytic metals include, but are not limited to, vanadium, chromium, molybdenum, tungsten, manganese, technetium, rhenium, iron, cobalt, nickel, ruthenium, palladium, rhodium, osmium, iridium, platinum, or mixtures thereof.

In one or more embodiments, the catalyst has a total amount of Groups 5 to 10 metals per gram of catalyst of at least 0.0001 grams, or at least 0.001 grams or at least 0.01 grams, in which grams are calculated on an elemental basis. For example, the catalyst can comprise a total amount of Group 5 to 10 metals in a range of from 0.0001 grams to 0.6 grams, or from 0.001 grams to 0.3 grams, or from 0.005 grams to 0.1 grams, or from 0.01 grams to 0.08 grams. In a particular embodiment, the catalyst further comprises at least one Group 15 element. An example of a preferred Group 15 element is phosphorus. When a Group 15 element is utilized, the catalyst can include a total amount of elements of Group 15 in a range of from 0.000001 grams to 0.1 grams, or from 0.00001 grams to 0.06 grams, or from 0.00005 grams to 0.03 grams, or from 0.0001 grams to 0.001 grams, in which grams are calculated on an elemental basis.

In an embodiment, the catalyst comprises at least one Group 6 metal. Examples of preferred Group 6 metals include chromium, molybdenum and tungsten. The catalyst may contain, per gram of catalyst, a total amount of Group 6 metals of at least 0.00001 grams, or at least 0.01 grams, or at least 0.02 grams, in which grams are calculated on an elemental basis. For example the catalyst can contain a total amount of Group 6 metals per gram of catalyst of from 0.0001 grams to 0.6 grams, or from 0.001 grams to 0.3 grams, or from 0.005 grams to 0.1 grams, or from 0.01 grams to 0.08 grams, the number of grams being calculated on an elemental basis.

In related embodiments, the catalyst includes at least one Group 6 metal and further includes at least one metal from Group 5, Group 7, Group 8, Group 9, or Group 10. Such catalysts can contain, e.g., the combination of metals at a molar ratio of Group 6 metal to Group 5 metal in a range of from 0.1 to 20, 1 to 10, or 2 to 5, in which the ratio is on an elemental basis. Alternatively, the catalyst will contain the combination of metals at a molar ratio of Group 6 metal to a total amount of Groups 7 to 10 metals in a range of from 0.1 to 20, 1 to 10, or 2 to 5, in which the ratio is on an elemental basis.

When the catalyst includes at least one Group 6 metal and one or more metals from Groups 9 or 10, e.g., molybdenum-cobalt and/or tungsten-nickel, these metals can be present, e.g., at a molar ratio of Group 6 metal to Groups 9 and 10 metals in a range of from 1 to 10, or from 2 to 5, in which the ratio is on an elemental basis. When the catalyst includes at least one of Group 5 metal and at least one Group 10 metal, these metals can be present, e.g., at a molar ratio of Group 5 metal to Group 10 metal in a range of from 1 to 10, or from 2 to 5, where the ratio is on an elemental basis. Catalysts which further comprise inorganic oxides, e.g., as a binder and/or support, are within the scope of the invention. For example, the catalyst can comprise (i) 1.0 wt. % or more of one or more metals selected from Groups 6, 8, 9, and 10 of the Periodic Table and (ii) 1.0 wt. % or more of an inorganic oxide, the weight percents being based on the weight of the catalyst.

In one or more embodiments, the catalyst is a bulk multimetallic hydroprocessing catalyst with or without binder. In an embodiment the catalyst is a bulk trimetallic catalyst comprised of two Group 8 metals, preferably Ni and Co and the one Group 6 metals, preferably Mo.

The present disclosure encompasses incorporating into (or depositing on) a support one or more catalytic metals e.g., one or more metals of Groups 5 to 10 and/or Group 15, to form the hydroprocessing catalyst. The support can be a porous material. For example, the support can comprise one or more refractory oxides, porous carbon-based materials, zeolites, or combinations thereof suitable refractory oxides include, e.g., alumina, silica, silica-alumina, titanium oxide, zirconium oxide, magnesium oxide, and mixtures thereof. Suitable porous carbon-based materials include, activated carbon and/or porous graphite. Examples of zeolites include, e.g., Y-zeolites, beta zeolites, mordenite zeolites, ZSM-5 zeolites, and ferrierite zeolites. Additional examples of support materials include gamma alumina, theta alumina, delta alumina, alpha alumina, or combinations thereof. The amount of gamma alumina, delta alumina, alpha alumina, or combinations thereof, per gram of catalyst support, can be in a range of from 0.0001 grams to 0.99 grams, or from 0.001 grams to 0.5 grams, or from 0.01 grams to 0.1 grams, or at most 0.1 grams, as determined by x-ray diffraction. In a particular embodiment, the hydroprocessing catalyst is a supported catalyst, the support comprising at least one alumina, e.g., theta alumina, in an amount of from 0.1 grams to 0.99 grams, or from 0.5 grams to 0.9 grams, or from 0.6 grams to 0.8 grams, the amounts being per gram of the support. The amount of alumina can be determined using, e.g., x-ray diffraction. In alternative embodiments, the support can comprise at least 0.1 grams, or at least 0.3 grams, or at least 0.5 grams, or at least 0.8 grams of theta alumina.

When a support is utilized, the support can be impregnated with the desired metals to form the hydroprocessing catalyst. The support can be heat-treated at temperatures in a range of from 400° C. to 1200° C., or from 450° C. to 1000° C., or from 600° C. to 900° C., prior to impregnation with the metals. In certain embodiments, the hydroprocessing catalyst can be formed by adding or incorporating the Groups 5 to 10 metals to shaped heat-treated mixtures of support. This type of formation is generally referred to as overlaying the metals on top of the support material. Optionally, the catalyst is heat treated after combining the support with one or more of the catalytic metals, e.g., at a temperature of from 150° C. to 750° C., or from 200° C. to 740° C., or from 400° C. to 730° C. Optionally, the catalyst is heat treated in the presence of hot air and/or oxygen-rich air at a temperature in a range between 400° C. and 1000° C. to remove volatile matter such that at least a portion of the Groups 5 to 10 metals are converted to their corresponding metal oxide. In other embodiments, the catalyst can be heat treated in the presence of oxygen (e.g., air) at temperatures in a range of from 35° C. to 500° C., or from 100° C. to 400° C., or from 150° C. to 300° C. Heat treatment can take place for a period of time in a range of from 1 to 3 hours to remove a majority of volatile components without converting the Groups 5 to 10 metals to their metal oxide form. Catalysts prepared by such a method are generally referred to as "uncalcined" catalysts or "dried." In embodiments involving hydroprocessing in a reactor that is downstream from the guard reactor(s), such catalysts can be prepared in combination with a sulfiding method, with the Groups 5 to 10 metals being substantially dispersed in the support. When the catalyst comprises a theta alumina support and one or more Groups 5 to 10 metals, the catalyst is generally heat treated at a temperature of 400° C. or more to form the hydroprocessing catalyst. Typically, such heat treating is conducted at temperatures of 1200° C. or less.

In certain embodiments, a relatively large surface area can be desirable. As an example, the hydroprocessing catalyst can have a surface area of 60 $m^2/g$ or more, or 100 $m^2/g$ or more, or 120 $m^2/g$ or more, or 170 $m^2/g$ or more, or 220 $m^2/g$ or more, or 270 $m^2/g$ or more; such as of from 100 $m^2/g$ to 300 $m^2/g$, or 120 $m^2/g$ to 270 $m^2/g$, or 130 $m^2/g$ to 250 $m^2/g$, or 170 $m^2/g$ to 220 $m^2/g$.

Conventional hydrotreating catalysts can be used, but the invention is not limited thereto. In certain embodiments, the catalysts include one or more of KF860 available from Albemarle Catalysts Company LP, Houston Tex.; Nebula® Catalyst, such as Nebula® 20, available from the same source; Centera® catalyst, available from Criterion Catalysts and Technologies, Houston Tex., such as one or more of DC-2618, DN-2630, DC-2635, and DN-3636; Ascent® Catalyst, available from the same source, such as one or more of DC-2532, DC-2534, and DN-3531; and FCC pretreat catalyst, such as DN3651 and/or DN3551, available from the same source. However, the invention is not limited to only these catalysts.

Additional Hydroprocessing Downstream from the Guard Reactor(s)

The temperature and pressure of the hydroprocessing conditions should be selected with consideration of the boiling point of the solvent. Preferably, the solvent should be in liquid phase but at high enough temperature to increase the tar molecule solvency. Higher temperatures and lower pressures are not preferred as significant solvent hydrogenation can occur.

Tar hydroprocessing in the presence of the utility fluid can be carried out in one or more hydroprocessing stages, the stages comprising one or more hydroprocessing vessels or zones. Vessels and/or zones within the hydroprocessing stage in which catalytic hydroprocessing activity occurs generally include at least one of the specified hydroprocessing catalyst. The catalysts can be mixed or stacked, such as when the catalyst is in the form of one or more fixed beds in a vessel or hydroprocessing zone.

The hydroprocessing is carried out in the presence of molecular hydrogen, e.g., by (i) combining molecular hydrogen with the tar and/or utility fluid upstream of the hydroprocessing and/or (ii) conducting molecular hydrogen to the hydroprocessing stage in one or more conduits or lines. Although relatively pure molecular hydrogen can be utilized for the hydroprocessing, it is generally desirable to utilize a "treat gas" which contains sufficient molecular hydrogen for the hydroprocessing and optionally other species (e.g., nitrogen and light hydrocarbons such as methane) which generally do not adversely interfere with or affect either the reactions or the products. Unused treat gas can be separated from the hydroprocessed product for re-use, generally after removing undesirable impurities, such as $H_2S$ and $NH_3$. The treat gas optionally contains about 50 vol. % or more of molecular hydrogen, e.g., about 75 vol. % or more, based on the total volume of treat gas conducted to the hydroprocessing stage.

Optionally, the amount of molecular hydrogen supplied to the hydroprocessing stage is 75 S $m^3/m^3$ or more (standard $m^3$ of molecular hydrogen per $m^3$ of (tar plus utility fluid)). Optionally, the amount of molecular hydrogen is from about 300 SCF/B (standard cubic feet per barrel of (tar+utility fluid)) (53 S $m^3/m^3$) to 5000 SCF/B (890 S $m^3/m^3$), such as 1000 SCF/B (178 S $m^3/m^3$) to 3000 SCF/B (534 S $m^3/m^3$). Hydroprocessing the tar in the presence of the specified utility fluid, molecular hydrogen, and a catalytically effective amount of the specified hydroprocessing catalyst under catalytic hydroprocessing conditions produces a hydroprocessed product including, e.g., upgraded SCT.

Tar hydroprocessing is generally carried out under hydroconversion conditions, e.g., under conditions for carrying out one or more of hydrocracking (including selective hydrocracking), hydrogenation, hydrotreating, hydrodesulfurization, hydrodenitrogenation, hydrodemetallation, hydrodearomatization, hydroisomerization, or hydrodewaxing. The hydroprocessing reaction can be carried out in at least one vessel or zone that is located, e.g., within a hydroprocessing stage downstream of the pyrolysis stage and separation stage. The specified tar contacts the hydroprocessing catalyst in the vessel or zone, in the presence of the utility fluid and molecular hydrogen. Catalytic hydroprocessing conditions can include, e.g., exposing the combined (tar+utility fluid) mixture to a temperature from 50° C. to 500° C., or from 200° C. to 450° C., or from 220° C. to 430° C., or from 260° C. to 275° C. (e.g., in a pretreater such as F of FIG. 1) or from 350° C. to 420° C. (e.g., in a main hydroprocessing reactor such as G of FIG. 1) proximate to the molecular hydrogen and hydroprocessing catalyst. For example, a temperature from 300° C. to 500° C., or 350° C. to 430° C. can be utilized.

Liquid hourly space velocity (LHSV) of the combined tar+utility fluid volume per volume of catalyst in a pretreater can be 0.1 h$^{-1}$ or more, e.g., from 0.1 h$^{-1}$ to 30 h$^{-1}$, or 0.2 h$^{-1}$, 0.5 h$^{-1}$ to 8 h$^{-1}$, or 2 h$^{-1}$ to 3 h$^{-1}$ or 6 h$^{-1}$, such as about 1.6.

Liquid hourly space velocity (LHSV) of the combined tar+utility fluid volume per volume of catalyst in a main hydroprocessing reactor can be 0.1 h$^{-1}$ or more, e.g., from 0.1 h$^{-1}$ to 30 h$^{-1}$, or 0.4 h$^{-1}$ to 25 h$^{-1}$, or 0.2 h$^{-1}$ to 2 h$^{-1}$, such as about 0.54 h$^{-1}$. In certain aspects, LHSV is at least 0.1 h$^{-1}$, or at least 0.2 h$^{-1}$, or at least 0.3 h$^{-1}$. In other aspects, LHSV is from 0.1 to 2.0, e.g., 0.25 to 0.6.

Molecular hydrogen partial pressure during a hydroprocessing is generally from 0.1 MPa to 12 Mpa, such as 1 MPa to 9 MPa, 0.1 MPa to 8 MPa, or 1 MPa to 7 MPa, or 2 MPa to 6 MPa, or 3 MPa to 5 MPa. In certain aspects, the partial pressure of molecular hydrogen is 12 MPa or less, or 9 MPa or less, or 3 MPa or less, or 2 MPa or less. Total pressure during the hydroprocessing is generally 10 bar gauge or more, e.g., from 15 bar gauge [bar(g)] to 135 bar(g), or 20 bar(g) to 120 bar(g), or 20 bar(g) to 100 bar(g). Molecular hydrogen consumption rate is based on the volume of molecular hydrogen per volume of tar. Generally, molecular hydrogen consumption rate is from about 53 standard cubic meters/cubic meter (S m$^3$/m$^3$) (300 SCF/B) to 1767 S m$^3$/m$^3$ (10,000 SCF/B), e.g., 148 S m$^3$/m$^3$ (835 SCF/B) to 1180 S m$^3$/m$^3$ (6,680 SCF/B), such as 177 S m$^3$/m$^3$ (1,000 SCF/B) to 3,000 SCF/B.

In particular aspects, hydroprocessing conditions in a pretreater can include one or more of a temperature from 260° C. to 275° C.; a pressure from 47 bar(g) (700 psig) to 133 bar(g) (2000 psig), e.g., 60 bar(g) (900 psig) to 87 bar(g) (1300 psig), a molecular hydrogen consumption rate from 25 S m$^3$/m$^3$ to 4,000 S m$^3$/m$^3$, e.g., from 25 S m$^3$/m$^3$ to 100 S m$^3$/m$^3$, for example about 35 S m$^3$/m$^3$; and an LHSV from 0.2 to 3.0, e.g., 1.0 to 2.0.

In particular aspects, hydroprocessing conditions in a main hydroprocessing reactor can include one or more of a temperature from 365° C. to 400° C.; a pressure from 47 bar(g) (700 psig) to 133 bar(g) (2000 psig), e.g., 60 bar(g) (900 psig) to 1800 psig, a molecular hydrogen consumption rate from 500 S m$^3$/m$^3$ to 4,000 S m$^3$/m$^3$, e.g., 1,000 S m$^3$/m$^3$ to 3,000 S m$^3$/m$^3$; and an LHSV from 0.2 to 2.0, e.g., 0.25 to 0.60. When operated under these conditions using the catalyst, TH conversion is generally 25% or more on a weight basis, e.g., 50% or more, resulting in the tar having desirable viscosity and blending characteristics.

Effluent is conducted away from the hydroprocessor, the effluent comprising converted tar, unconverted tar, unconverted treat gas, utility fluid, hydrogen sulfide, etc., a vapor-phase portion is separated from the effluent and conducted away, the vapor-phase portion having a final boiling point <40° C. and comprising molecular hydrogen, hydrogen sulfide, and light hydrocarbon gasses. The remainder of the effluent can be subjected to further separations, e.g., one or more of (i) separating an aromatics-containing stream having a boiling range of about 40° C. to about 430° C., e.g., about 170° C. to about 430° C., or about 200° C. to about 430° C., or about 175° C. to about 400° C., or about 200° C. to about 400° C., and (ii) a hydroprocessed tar having a true boiling range of 400° C. or more, e.g., 430° C. or more. At least a portion of the separated aromatics-containing stream can be recycled to the process for use as utility fluid.

An effluent conducted away from the pretreater can have a BN of 30 or less, such as 20 or less, such as 15 or less, such as 12 or less, such as 10 or less, such as 8 or less, such as 6 or less.

Conventional hydroprocessing catalyst can be utilized for hydroprocessing the tar stream in the presence of the utility fluid, such as those specified for use in resid and/or heavy oil hydroprocessing, but the invention is not limited thereto. Suitable hydroprocessing catalysts include those comprising (i) one or more bulk metals and/or (ii) one or more metals on a support. The metals can be in elemental form or in the form of a compound.

Experimental

The catalyst used in guard reactor experiments was TK-609 HYBRIM™, available from Haldor Topsoe A/S of Denmark. Guard reactor experiments were performed at 250° C., 1200 psi, and 2 WHSV. The rest of the conditions were selected to be the same in order to make fair comparisons: 3:1 ratio of H$_2$ per barrel of feed.

Feed to the reactor was 40 wt. % utility fluid and 60 wt. % tar. The feed mixture and SCGO comparative were hydroprocessed and reactor effluent cooled to room temperature (23° C.).

Olefinic species (vinyl aromatics) were measure by ASTM-D1159. Hydrogen consumption (on a tar basis) was measured by ASTM-7171 via hydrogen content difference between liquid feed and product. SCGO is steam crack gas oil, and PDU feed is pilot unit feed. SCGO used had a density of 0.9589 g/cm$^3$ and a viscosity measured at 50° C. of 1.4426 cSt. PDU used (60/40 tar/solvent) had a density of 1.0855 g/cm$^3$ and a viscosity measured at 50° C. of 34.992 cSt.

"Sulfided" samples were sulfided (before introducing an oil/tar feed into the guard reactor) and was done so using a solution of 80 wt. % Isopar/20 wt. % dimethyldisulfide (DMDS) according to the following protocol:

Start feed pump at specified rate (1 cc/min or WHSV=1 hr$^{-1}$)

Run pump until reactor is liquid full (check the KO pot for sample collecting to verify)

Reduce feed pump flow to specified rate (0.042 cc/min).

Start hydrogen flow at specified rate (20 sccm).

Start furnace temperature ramps as shown in Table 1. Use the same ramp parameters for all furnace zones.

TABLE 1

|  | Set Point (° C.) | Ramp Rate (° C./hr) | Hold Time (hr) |
|---|---|---|---|
| Phase 1 | 110 | 60 | 1 |
| Phase 2 | 240 | 60 | 12 |
| Phase 3 | 340 | 60 | 60 |

When the sulfiding was complete (end of Phase 3), the pump was cleaned with solvent (TMB, A200 or similar).

Reactor temperature then decreased to 200° C. and flushed the system with the feed (tar+solvent) or a solvent (TMB, A200 or similar).

Hydrogen flow was then restarted for 1 hour to purge any remaining solvent/sulfiding solution.

Once sulfiding was complete, a tar/solvent mixture was fed to the reactor for the tar hydroprocessing tests. The very first product was discarded and not used for analytical measurements because of the possibility of contamination (with sulfiding solutions or rinsing solution).

Figure 4:
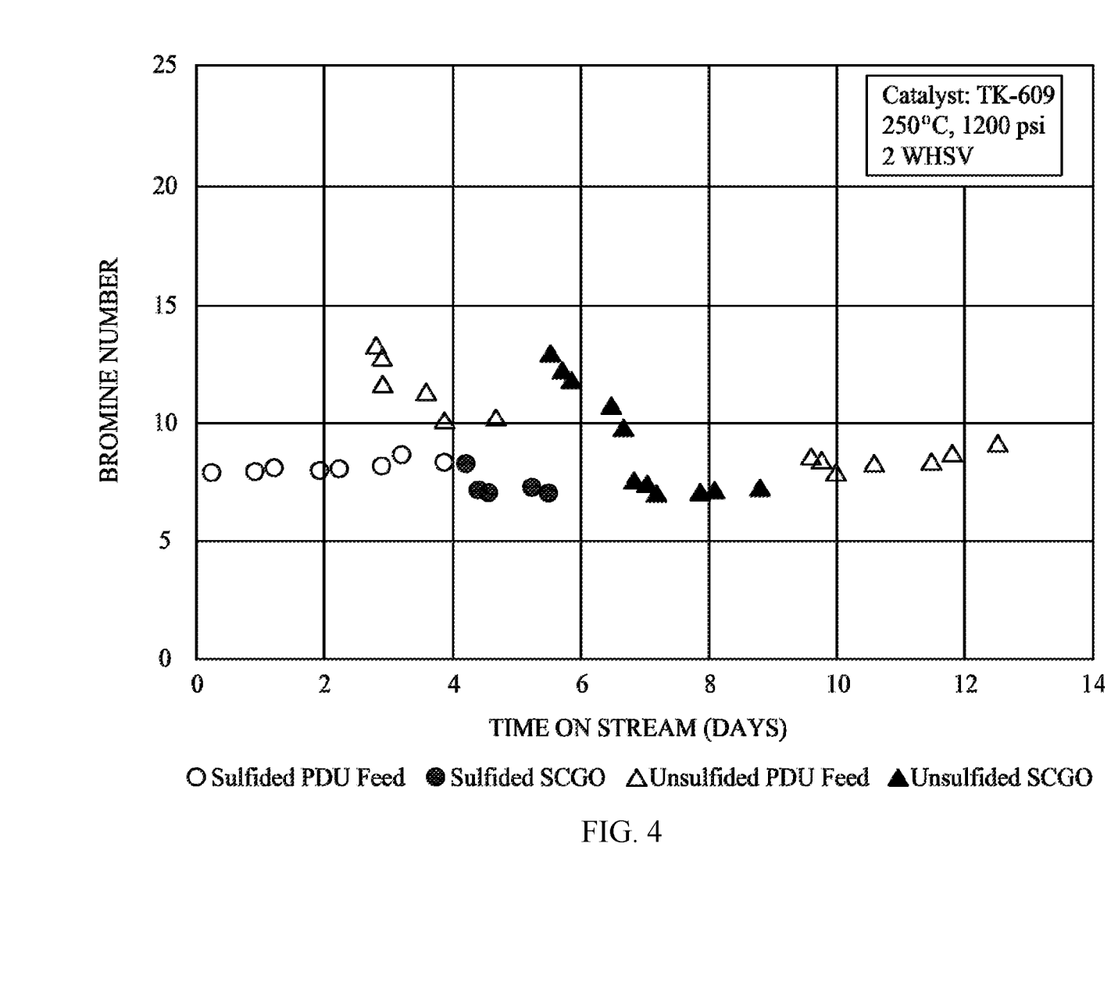
FIG. 4 is a graph illustrating bromine number versus time on stream (days) of sulfide and unsulfided feeds, according to at least one embodiment.

FIG. 4 is a graph illustrating bromine number versus time on stream (days) of sulfide and unsulfided feeds. Within seven days, similar performance was observed for the self-sulfided ("unsulfided") guard reactor catalysts as compared to the sulfided guard reactor catalysts. In particular, after a time on stream of seven days, unsulfided PDU feed (i.e., PDU feed sent to the unsulfided reactor) and unsulfided SCGO (i.e., SCGO sent to the unsulfided reactor) provided a BN value of about 8 after hydroprocessing in a pretreater. The sulfided PDU feed and sulfided SCGO after a time on stream of 1 day and 4 days, respectively, also provided a BN value of about 8.

Figure 5:
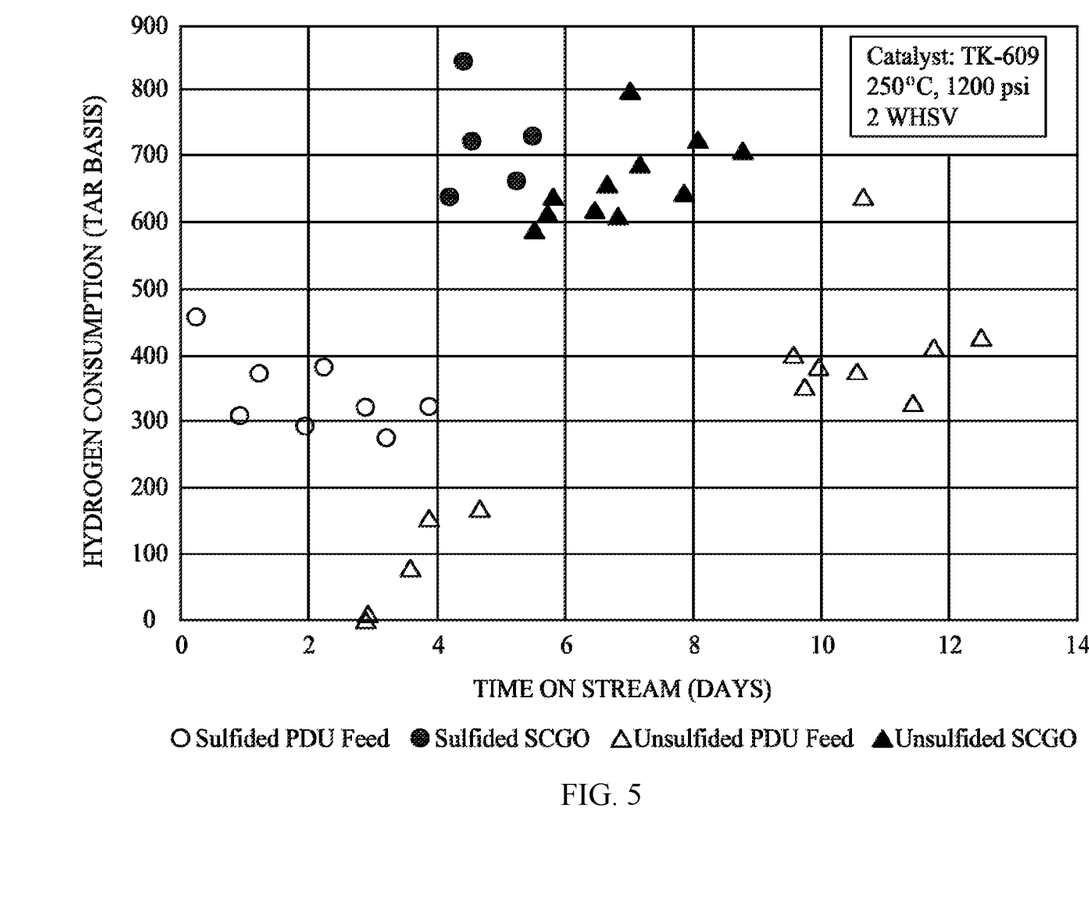
FIG. 5 is a graph illustrating hydrogen consumption versus time on stream (days) of sulfided and unsulfided feeds, according to at least one embodiment.

FIG. 5 is a graph illustrating hydrogen consumption versus time on stream (days) of sulfided and unsulfided feeds. Within seven days, similar performance was observed for the self-sulfided ("unsulfided") guard reactor catalysts as compared to the sulfided guard reactor catalysts. For example, a hydrogen consumption (tar basis) of from about 600 S m$^3$/m$^3$ to about 800 S m$^3$/m$^3$ was observed for both sulfided SCGO and unsulfided SCGO after a time on stream of 4 or more days. In addition, a hydrogen consumption (tar basis) of from about 250 S m$^3$/m$^3$ to 450 S m$^3$/m$^3$ was observed for both sulfided PDU feed and unsulfided PDU feed after a time on stream of 1 day and 9 days, respectively.

These data illustrate that the need for conventional sulfiding procedures for the guard reactor can be lessened or eliminated and the SATC feed can be used to at least partially self-sulfide the catalyst of the guard reactor. Since the guard reactor is designed to protect against reactive fouling and solids accumulations in the pretreater, high catalyst activity is not needed and a modest reduction in reactivity prior to feeding to the pretreaters can be sufficient for obtaining liquid hydrocarbon product from a SATC process.

Overall, the present disclosure demonstrates methods for hydroprocessing of pyrolysis tars. In particular, the present disclosure provides methods for sulfiding guard reactor catalyst(s) in a guard reactor without sulfiding the guard reactor catalyst(s) before introducing pyrolysis tar into one or more of the guard reactors. Methods of the present disclosure can provide reduced demand in energy consumption of a solvent assisted tar conversion process, reduced use of materials and equipment, and reduced amount of time to obtain hydroprocessing products (such as low-sulfur fuel oil), while maintaining or improving reactor fouling during the various hydroprocessing stages.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the example and descriptions set forth herein, but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

The invention claimed is:

1. A process for preparing a liquid hydrocarbon product comprising:
    providing a first process stream comprising a first tar, wherein the first tar is produced by heat soaking a second tar, and the first tar has a reduced reactivity compared to the second tar;
    blending the first process stream with a utility fluid to reduce viscosity of the first process stream and produce a second process stream comprising solids and a reduced reactivity, lower viscosity tar;
    introducing the second process stream into a guard reactor comprising one or more catalysts without sulfiding the guard reactor catalyst(s) before introducing the second process stream into the guard reactor;
    hydroprocessing the second process stream in the guard reactor under hydroprocessing conditions to produce a third process stream;
    hydroprocessing the third process stream in a pretreater to produce a fourth process stream having a bromine number of 12 or less;
    hydroprocessing the fourth process stream to produce a fifth process stream comprising the liquid hydrocarbon product and the utility fluid; and
    separating the utility fluid from the liquid hydrocarbon product.

2. The process of claim 1, further comprising removing solids from the second process stream before introducing the second process stream into the guard reactor.

3. The process of claim 2, wherein the second process stream is free of solids of size larger than 25 µm.

4. The process of claim 1, wherein the fourth process stream has a bromine number lower than 10.

5. The process of claim 1, wherein the fourth process stream has a bromine number lower than 8.

6. The process of claim 1, wherein the first tar is produced by separating the second tar from a steam cracker effluent and exposing the second tar to temperatures from 200° C. to 300° C. for 10 min to 30 min.

7. The process of claim 1, wherein 90 wt. % or greater of the first process stream's molecules have an atmospheric boiling point of 290° C. or greater.

8. The process of claim 1, wherein the first process stream comprises one or more of: (i) a TH content of from 5 wt. % to 40 wt. %, based on the weight of the first process stream; wherein TH means a product of hydrocarbon pyrolysis having an atmospheric boiling point of 565° C. or greater and comprising 5 wt. % or greater of molecules having a plurality of aromatic cores based on the weight of the product; and (ii) an API gravity (measured at a temperature of 15.8° C.) of −7.5° API or less, and (iii) a 50° C. viscosity of from 200 cSt to $1.0 \times 10^7$ cSt.

9. The process of claim 8, wherein the first process stream has a sulfur content of from 0.5 wt. % to 7 wt. %.

10. The process of claim 1, wherein hydroprocessing the second process stream is performed at a liquid hourly space velocity of from 0.1 $h^{-1}$ to 30 $h^{-1}$ and hydroprocessing the third process stream is performed at a liquid hourly space velocity of from 0.5 $h^{-1}$ to 8 $h^{-1}$.

11. A process for preparing a liquid hydrocarbon product comprising:
   blending a first process stream with a utility fluid to produce a second process stream, wherein the first process stream comprises a first tar produced by heat soaking a second tar, and the first tar has a reduced reactivity compared to the second tar;
   introducing the second process stream into a guard reactor comprising one or more catalysts without sulfiding the catalyst(s) before introducing the second process stream into the guard reactor;
   hydroprocessing the second process stream in the guard reactor under hydroprocessing conditions to produce a third process stream; and
   hydroprocessing the third process stream to produce a fourth process stream having a bromine number of 12 or less and comprising the liquid hydrocarbon product and the utility fluid.

12. The process of claim 11, wherein hydroprocessing the second process stream is performed at a temperature of from 250° C. to 300° C.

13. The process of claim 11, wherein hydroprocessing the second process stream is performed at a liquid hourly space velocity of from 0.1 $h^{-1}$ to 30 $h^{-1}$.

14. The process of claim 11, wherein hydroprocessing the third process stream is performed at a temperature of from 260° C. to 320° C.

15. The process of claim 11, wherein hydroprocessing the third process stream is performed at a pressure of from 900 psig to 1,800 psig.

16. The process of claim 11, wherein hydroprocessing the fourth process stream is performed at a pressure of from 900 psig to 1,800 psig.

17. The process of claim 11, wherein hydroprocessing the third process stream is performed at a molecular hydrogen consumption rate from 25 S $m^3/m^3$ to 100 S $m^3/m^3$.

18. The process of claim 11, wherein hydroprocessing the third process stream is performed at a liquid hourly space velocity of from 0.5 $h^{-1}$ to 8 $h^{-1}$.

19. The process of claim 11, wherein hydroprocessing the second process stream in the guard reactor comprises preheating the second process stream in a heater and combining the second process stream with a treat gas.

20. The process of claim 19, wherein the treat gas comprises molecular hydrogen.

21. A process for preparing a liquid hydrocarbon product comprising:
   blending a first process stream with a utility fluid to produce a second process stream;
   introducing the second process stream into a reactor into which one or more catalysts has been loaded, but without sulfiding the loaded catalyst(s) prior to introducing the second process stream into the reactor;
   hydroprocessing the second process stream in the reactor under hydroprocessing conditions to produce a third process stream;
   hydroprocessing the third process stream to produce a fourth process stream;
   hydroprocessing the fourth process stream to produce a fifth process stream comprising the utility fluid and the liquid hydrocarbon product; and
   separating the utility fluid from the liquid hydrocarbon product.

22. The process of claim 21, wherein hydroprocessing the second process stream in the reactor is performed at a run length of 2 months or greater.

23. The process of claim 21, wherein the fourth process stream has a bromine number of 12 or less.

24. The process of claim 21, wherein hydroprocessing the third process stream is performed at one or more of:
   a temperature of from 260° C. to 340° C.,
   a liquid hourly space velocity of from 0.2 $h^{-1}$ to 6 $h^{-1}$,
   a molecular hydrogen partial pressure of from 0.1 MPa to 12 Mpa, or
   a molecular hydrogen consumption rate of from 25 SCF/B to 100 SCF/B.

25. A process for preparing a liquid hydrocarbon product comprising:
   steam cracking a heavy oil at a temperature of from 760° C. to 880° C. and a pressure of from 1 to 5 bars (absolute) to produce a first process stream, wherein the first process stream comprises a first tar produced by heat soaking a second tar, and the first tar has a reduced reactivity compared to the second tar;
   blending the first process stream with a utility fluid to produce a second process stream;
   introducing the second process stream into a guard reactor into which has been loaded one or more catalysts, wherein the catalysts have not been sulfided after loading the catalyst into the guard reactor;
   hydroprocessing the second process stream in the guard reactor at a temperature of from 250° C. to 300° C. and a liquid hourly space velocity of from 1 to 10 to produce a third process stream;
   hydroprocessing the third process stream in a pretreater at a temperature of from 260° C. to 340° C., at a molecular hydrogen consumption rate from 25 S $m^3/m^3$ to 100 S $m^3/m^3$, at a molecular hydrogen partial pressure of from 0.1 MPa to 12 Mpa, and at a liquid hourly space velocity of from 0.2 $h^{-1}$ to 6 $h^{-1}$ to produce a fourth process stream having a bromine number of 12 or less;
   hydroprocessing the fourth process stream at a temperature of 340° C. or greater, at a liquid hourly space velocity of from 0.2 $h^{-1}$ to 2 $h^{-1}$, at a molecular hydrogen partial pressure of from 0.1 MPa to 12 Mpa, and at a molecular hydrogen consumption rate of from 1,000 SCF/B to 3,000 SCF/B to produce a fifth process stream comprising the liquid hydrocarbon product and the utility fluid; and
   separating the utility fluid from the liquid hydrocarbon product.

* * * * *